US006802611B2

(12) United States Patent
Chu et al.

(10) Patent No.: US 6,802,611 B2
(45) Date of Patent: Oct. 12, 2004

(54) SYSTEM AND METHOD FOR PRESENTING, CAPTURING, AND MODIFYING IMAGES ON A PRESENTATION BOARD

(75) Inventors: Simon C. Chu, Chapel Hill, NC (US); William J. Piazza, Holly Springs, NC (US); David B. Rhoades, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/277,409

(22) Filed: Oct. 22, 2002

(65) Prior Publication Data

US 2004/0075820 A1 Apr. 22, 2004

(51) Int. Cl.[7] .......................... G03B 21/26; G03B 21/00
(52) U.S. Cl. .................................... 353/28; 353/42
(58) Field of Search .................. 348/14.01, 14.03; 725/9, 10, 12, 13, 19; 353/28, 42, 122, 121

(56) References Cited

U.S. PATENT DOCUMENTS

| | | | | |
|---|---|---|---|---|
| 5,239,373 A | * | 8/1993 | Tang et al. | 348/14.01 |
| 6,260,973 B1 | * | 7/2001 | Minato et al. | 353/42 |
| 6,346,933 B1 | * | 2/2002 | Lin | 345/157 |
| 6,431,711 B1 | * | 8/2002 | Pinhanez | 353/69 |
| 6,527,395 B1 | * | 3/2003 | Raskar et al. | 353/70 |
| 6,554,434 B2 | * | 4/2003 | Sciammarella et al. | 353/98 |
| 2001/0032057 A1 | * | 10/2001 | Smith et al. | 702/94 |
| 2002/0002629 A1 | * | 1/2002 | Fukushima | 709/310 |

FOREIGN PATENT DOCUMENTS

JP        127684 A     4/2000

OTHER PUBLICATIONS

Elrod et al., Lieboard: A Large Interactive Display Supporting Group Meetings, Presentations and Remote Collaboration, Jun. 1992, ACM: Proceedings of the SIGCHI conference on Human factors in computing systems, pp. 599–607.*

Tang, John C. and Minneman, Scott L., Videodraw: A Video Interface for Collaborative Drawing, Apr. 1991, ACM Transactions on Information Systems (TOIS), vol. 9 Issue 2, pp. 170–184.*

Underkoffler et al., Emancipated Pixels: Real–World Graphics in the Luminous Room, Jun. 1999, ACM: Proceedings of the 26th annual conference on Computer graphics and interactive techniques (SIGGRAPH 99), pp. 385–392.*

* cited by examiner

*Primary Examiner*—Rodney Fuller
*Assistant Examiner*—Andrew Sever
(74) *Attorney, Agent, or Firm*—Sawyer Law Group

(57) ABSTRACT

A system and method for presenting and capturing images on a presentation board are described. More particularly, embodiments of the present invention provide a projector adapted to display one or more images onto a surface and a camera adapted to capture the one or more images from the surface. Also provided is an interface electronics coupled to the projector and to the camera. The interface electronics is adapted to feed the projector with the one or more images and adapted to process the one or more images from the camera. Also a user can control the presentation system by modifying the one or more images on the surface.

39 Claims, 4 Drawing Sheets

SYSTEM AND METHOD FOR PRESENTING, CAPTURING, AND MODIFYING IMAGES ON A PRESENTATION BOARD

FIELD OF THE INVENTION

The present invention relates to communication systems and more particularly to a system and method for presenting and capturing images on a presentation board.

BACKGROUND OF THE INVENTION

Presentation boards are well known and prevalent in business environments today. One of the most common presentation boards is a so-called "whiteboard." A whiteboard is a hard white surface upon which a person may write or draw using special "dry erase" markers. When the drawing or text is no longer needed, a cloth eraser is passed over the image, removing the black marks left by the marker.

Often, the image drawn on a whiteboard during the course of a meeting needs to be saved by one or more of the attendees. In many cases, this results in the image being manually copied into a notebook before the image can be erased and the next image created. A problem with this is that it is both time consuming and error prone.

One solution is to take photographs of important images to assure that they are saved, or "captured," properly. A problem with this is that photographic images of a whiteboard are often difficult to read. Furthermore, even the use of a camera to record the image may require additional transcription before the information may be used for other purposes, such as emailing to the attendees or inclusion in subsequent presentations, for example. The Panasonic Panaboard (KX-BP series) is an example of a device that uses a CCD camera to view images on the whiteboard and captures them to a file or prints them.

Attempting to resolve the issues of speed and accuracy in capturing images, products have emerged that use a variety of techniques to automatically record the contents of a whiteboard.

One solution uses a special whiteboard (e.g., sensitive to pressure or containing infrared or ultrasonic transducers) to sense markings. Another solution uses a whiteboard that contains an array of light sensitive components such as phototransistors that are capable of sensing dark markings on the surface of a translucent screen.

A problem with such solutions is that they are not very practical, because of the size of the whiteboard, the cost of the transducers, and the need for near perfect input from the large array of sensors.

Another solution is to use a roll of paper that scrolls across the front of the device. A clean area of the paper is moved into position on the front of the device and the paper is held stationary while the image is drawn. When the image is complete, the paper is made to scroll again and the image passes under a scanner on the side of the device. At the same time that the image is scanned, a clean area of paper is moved into position on the front of the device for the next image. U.S. Pat. No. 5,914,745 describes an example of such a device.

Generally, these solutions attempt to address the problem of capturing images from a white board. The problem with all of these devices is that they are tedious, inaccurate, or require a special whiteboard, or a whiteboard combined with an image sensor or scanner making them not very portable.

Accordingly, what is needed is a system and method for presenting and capturing images on a presentation board. The system and method should be portable and convenient to use. The present invention addresses such needs.

SUMMARY OF THE INVENTION

An image capture and display (ICD) device and a method of use are disclosed. The ICD device includes a projector adapted to display one or more images onto a surface and a camera adapted to capture the one or more images from the surface. Also provided is an interface and control electronics coupled to the projector and to the camera. The interface and control electronics is adapted to feed the projector with the one or more images and adapted to process the one or more images from the camera.

According to the system and method disclosed herein, the present invention provides numerous benefits. It provides a useful, novel, and non-trivial solution to the problem of presenting, capturing, and modifying images on a whiteboard in a conference room, classroom, or office environment. In addition to the ability to display presentations prepared in advance and the ability to record drawings produced during the course of a meeting, the system responds to other types of input. Such input can include gestures or menu selections made by a person. Such input can be used to modify the current drawing or text, save the current contents of the whiteboard, recall a previous image.

DETAILED DESCRIPTION

The present invention relates to communication systems and more particularly to a system and method for presenting and capturing images on a presentation board. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Generally, a system and method in accordance with the present invention facilitate presentations by providing a system that intelligently displays and captures images. Such images can include diagrams and text, for example. Specifically, an apparatus for intelligently projecting information onto a presentation board and capturing marks made on the presentation board during course of a meeting is provided. To more particularly describe the present invention, refer now to the following discussion in conjunction with the associated figures.

Figure 1:
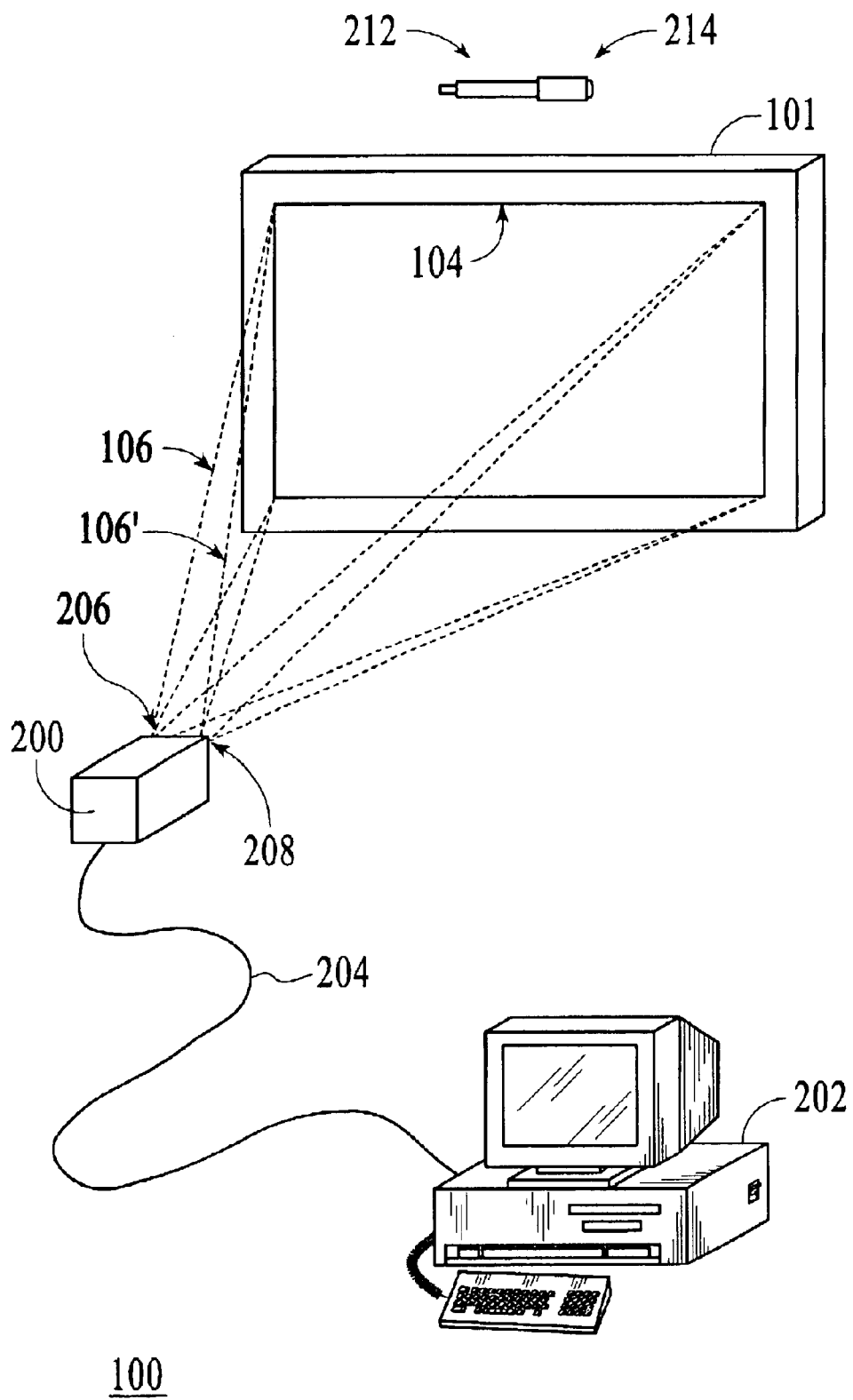
FIG. 1 is a diagram of an image display and capture (IDC) system in accordance with the present invention.

FIG. 1 is a diagram of an image display and capture (IDC) system 100, in accordance with the present invention. The IDC system 100 works with any existing presentation board such as whiteboard 101, which includes a portion 104 onto which an image 106 is projected. The IDC system 100 includes an IDC device 200, which projects the image 106 on the whiteboard 101. In this specific embodiment, the IDC system 100 also includes a computer system 202, which is coupled to the IDC device 200 via an interconnecting cable 204 (e.g., a USB cable). The image 106 can originate from image data stored on the IDC device 200 or on the computer system 202. Hence, in some embodiments where the image data is stored on the IDC device 200, the computer system 202 need not be present and still remain within the spirit and the scope of the present invention. The IDC device 200 can include an internal processor of its own to control the IDC device 200, a network connection, and/or an internal CD RW drive upon which image data can be stored and from which presentations may be retrieved, etc.

Figure 2:
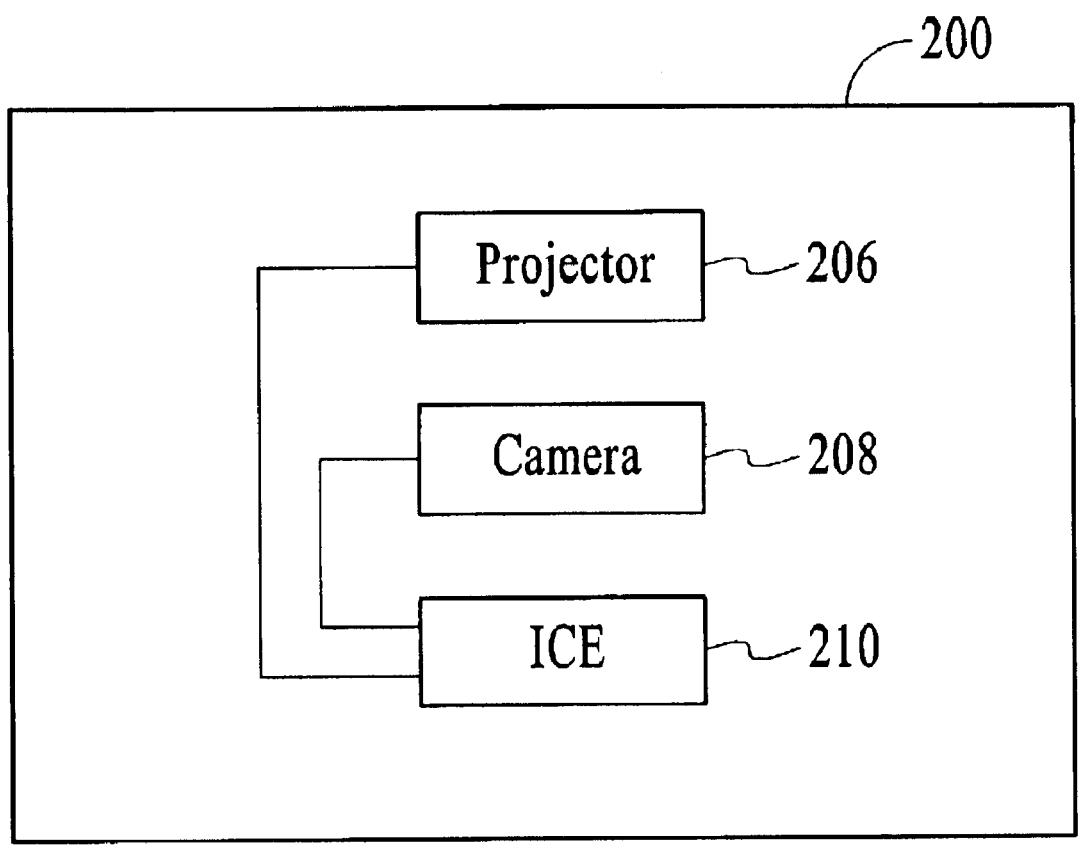
FIG. 2 is a block diagram of the IDC device in accordance with the present invention.

FIG. 2 is a block diagram of a preferred embodiment of the IDC device 200 of FIG. 1, in according with the present invention. The IDC device 200 includes a projector 206, a camera 208, and an interface and control electronics (ICE) 210. The projector 206 and the camera 208 are coupled to the ICE 210. In this specific embodiment, the projector is a liquid crystal display (LCD) projector and the camera is a charged-coupled device (CCD) camera. The projector 206 is used to project the image 106 onto the whiteboard 101. The camera 208 is used to capture images 106' from the whiteboard 101.

In a specific embodiment, the grading of the camera will depend on the specific application such as the size of the whiteboard 101. For example, if the whiteboard 101 dimensions are 60" wide×45" high, a 1/16" resolution implies that the camera 208 have at least 960 picture elements across and 720 picture elements up and down. This is well within the capabilities of today's CCD cameras. A 1/16" resolution is believed to be sufficient to properly view marks made on the whiteboard by dry erase markers.

In one embodiment of the present invention, the camera 208 can view images through its own set of optical components. In another embodiment, the camera 208 can have a single, common focusing lens and a partially silvered mirror inside of the IDC device 200 of FIG. 1 to see the whiteboard 101 without interference from the projector 206. In another embodiment, a dual-optic system is used, where separate optical paths are provided for the projected images and the viewed images. Other optic systems can also be used.

Still referring to FIG. 2, in one embodiment the ICE 210 processes image data to and from the projector 206 and the camera 208, respectively. In a second embodiment, where the computer system 202 (FIG. 1) controls the ICE 210 to provide an interface among the projector 206, the camera 208, and the computer system 202.

Referring to FIG. 1, the IDC device 200 is placed at a distance from the whiteboard 101 to optimally fill the whiteboard surface, e.g., the portion 104. The IDC device 200 is also placed such that glares from the projection build will not be an issue for attendees.

The IDC device 200 captures the image 106' from the portion 104 of the whiteboard 101. The area captured is substantially the same as the area onto which the image 106 is projected.

Markings may be produced on the whiteboard 101 using a marker 212. The marker 212 can be a standard dry erase marker. The IDC system 100 can also incorporate the use of a laser pointer 214. The laser pointer 214 can be used to interact with the IDC device 200. In a specific embodiment, the laser pointer can slide over the end of the marker 212. This ensures that the cost of the marker 212 is kept low and that the laser pointer 214 is conveniently available when needed.

In another embodiment, the laser pointer 214 can be used instead of the dry erase marker for drawing diagrams on the whiteboard 101. In this mode of operation, the tracing of laser light across the whiteboard 101 can be immediately be displayed (via the projector 206) as lines, allowing the operator to "make marks" on the whiteboard 101. Such marks can be erased electronically via the menus. Since there are no dry erase marks on the actual whiteboard, this mode of operation is ideal for making changes to previously captured images. The IDC device 200 can also detect and process gestures made by the operator using the laser pointer. Such gestures can be used in place of menu or other inputs to change an image or initiate a task. For example, the proofreader's mark to delete text could be made near a projected item using the laser pointer and the IDC device 200 would remove the projected item. A specific embodiment of the present invention can project images, sense markings and a laser point light from the rear of a suitably translucent screen.

In another embodiment, alternate input devices can be used. While the laser pointer is a convenient way to for an operator to communicate with the IDC device 200, the operator can also use a keyboard, mouse, touch screen, pad and stylus device, etc. Such input devices can be coupled to either to the IDC device 200 or to an external computer system.

In operation, the IDC 200 is placed in front of the whiteboard 101, connected to the computer system 202, and is powered. While initializing, the IDC device 200 can project a test pattern onto the whiteboard 101. The IDC device 200 senses the test pattern using the camera 208. The IDC device 200 uses the test pattern information captured by the camera 208 to improve the focus of projected images and to determine the registration of displayed pixels and viewed pixels. Note that the conventional system has not been concerned with the registration of the viewed image, because the viewed image had not been correlated to a projected image and because the viewing subsystem was permanently attached to the whiteboard.

The placement of the ICE device 210 will vary from one use to the next, both in terms of distance to the whiteboard 101 and also the angle of projection. Both of these factors can be accounted for by software within the IDC device 200 once a pattern has been projected and viewed from a given location.

To compensate for surface and lighting defects, while initializing, the IDC device 200 can record a "blank field" image that will include defects on the surface of the whiteboard 101 and areas of problematic lighting conditions (such as glare from a window). Later, while capturing images, the IDC device 200 can attempt to compensate by adjusting these areas of the image 106 to remove the defect or glare.

After the IDC device 200 has initialized itself and determined the mapping between projected pixels and viewed pixels, it can clear the screen and allow people in the room to begin drawing on the whiteboard. Because the person writing on the board will obstruct a portion of the screen, two possible modes of operation exist for the IDC system 100. In the first mode of operation, the IDC device 200 saves the completed image 106' (or intermediate versions of the image 106') only when commanded to do so. For example, the operator can produce a drawing, step aside, and request that the image 106' be saved.

In the second mode of operation, advanced software within the IDC device 200 constantly compares the image 106' captured by the camera 208 (FIG. 2) with previous image 106 of the white board 101 and automatically saves the image 106 when there are no changes for a certain period of time. (For example, if 15 seconds pass with no changes to the input images 106, the image 106 can be saved and cataloged.) Note that the use of such an auto-save mechanism does not preclude the use of operator-initiated commands to save an image 106 or 106' cataloged under a particular identifying name.

The IDC device 200 can provide prompts and messages by projecting text or icons onto the whiteboard 101. For example, after the IDC device has saved an image 106' it may display the text "Saved" off in a corner of the whiteboard 101 to inform the operator that it is now safe to erase the whiteboard 101. Advanced software takes into account messages projected by the IDC device 200 itself when comparing the viewed images, looking for a change.

Naturally, the projector portion of the IDC device 200 may be used to display presentations that were prepared in advance. Because of the presence of the camera 208 and the registration of images 106 that are projected and viewed images 106' that are viewed, the IDC device 200 can collect additional text and drawings that are made over top of a "canned" presentation (i.e., markups).

Furthermore, the IDC device 200 can recall a previously saved image for the purpose of presenting or further editing, as well as capture existing images already on the whiteboard 101 or include marked up images on the whiteboard 101. As mentioned above, images include text and drawings.

The capture of additional markings may be automatic or manually initiated. Also, other uses of the projector 206 are possible. For example, when creating a drawing or table, the IDC device 200 can provide assistance to the operator if the IDC device 200 can sense input from the operator directly.

For example, if the operator wishes to draw a pie chart, she may desire that the IDC device 200 produce a perfect circle that she can add division lines to. She may further desire the IDC device 200 to fill different sections of the pie chart with coloration to clarify the chart. If the IDC device 200 can be made aware of the operator's requests, it can easily produce the desired effect by using the projector 206 of the IDC device 200.

The operator may instruct the IDC device 200 to perform certain tasks such as those described above (i.e., saving an image, starting a presentation, producing or coloring portions of the drawing, etc) through the use of a small laser pointer. The laser point 250 produces an intense point of light when turned on and aimed at the whiteboard 101. This point of light is visible to the IDC device 200 through the facilities of the camera 208 and is further easily distinguishable from other markings and projections that may appear on the whiteboard due to the intensity of the light. Therefore, with proper software, the IDC device 200 is able to determine when and where the operator has activated the laser pointer 214. Pushing a button on the side of the laser pointer typically activates the laser pointer.

FIGS. 3–6 illustrate an operator using the IDC system 100.

Figure 3:
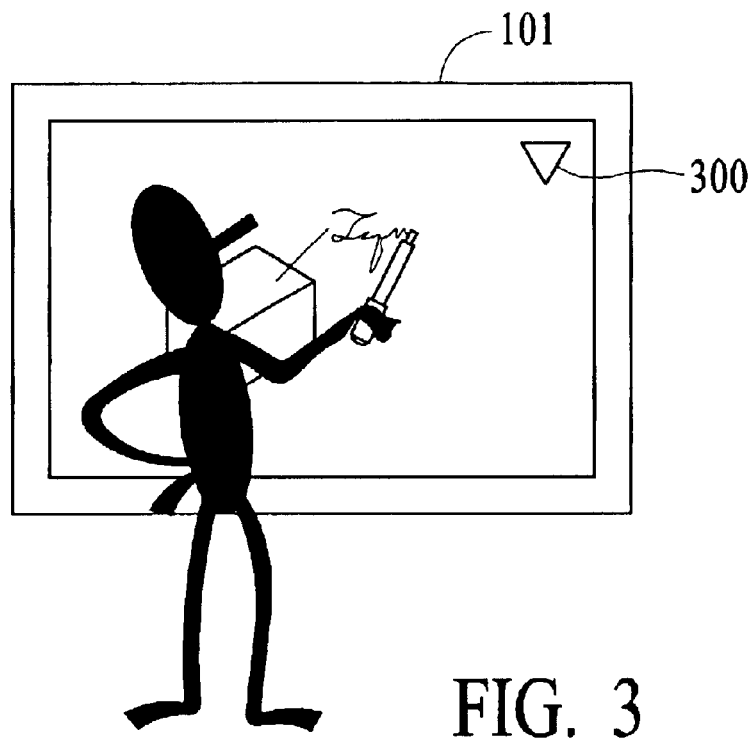
FIG. 3 is a diagram showing an operator making a freehand drawing of a cube in accordance with the present invention.

FIG. 3 is a diagram showing an operator making a freehand drawing of a cube in accordance with the present invention. There are a number of ways that the user interface between the IDC device 200 and the operator could be designed. In a specific embodiment of the present invention, various forms of menus are used. For example, the menu used by the operator to request actions from the IDC device 200 is normally not displayed and is represented on the whiteboard 101 by an icon 300 projected to the top right corner of the whiteboard 101. The appearance, organization, and implementation detail of the menu 302 can vary and will depend on the specific application.

Figure 4:
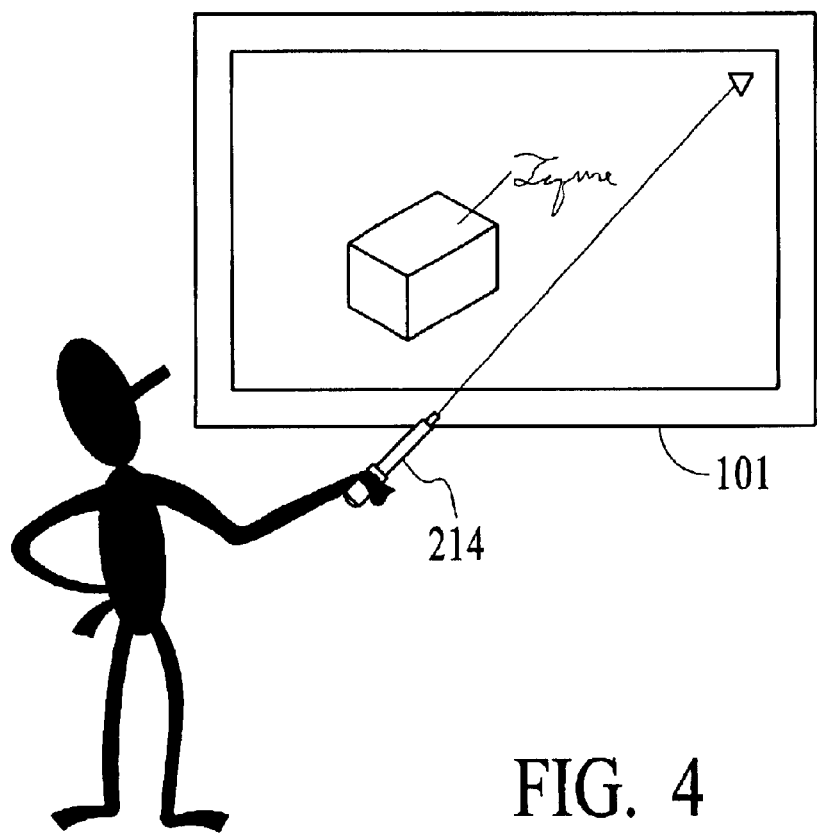
FIG. 4 is a diagram showing an operator requesting a menu from the IDC system in accordance with the present invention.

FIG. 4 is a diagram showing an operator requesting a menu from the IDC system 100, in according with the present invention. To request the menu, the operator activates the laser pointer 214 while pointing at the icon 300 in the upper right corner of the whiteboard 101.

Figure 5:
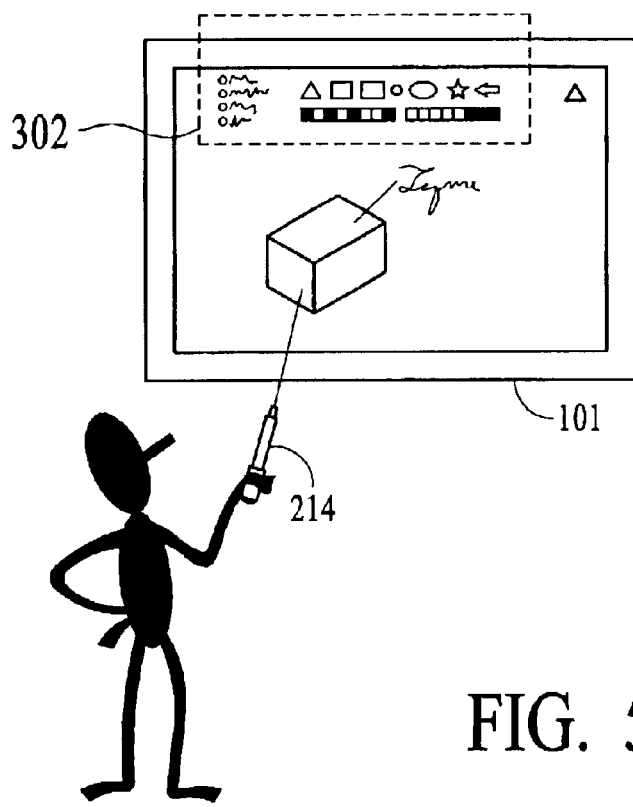
FIG. 5 is a diagram showing a menu from the IDC system in accordance with the present invention.

FIG. 5 is a diagram showing a menu from the IDC system 100, in according with the present invention. Upon the IDC device 200 sensing the laser light for the laser pointer 214 at the correct coordinates, the IDC device 200 displays a menu 302. The menu 302 provides options for common tasks such as saving an image, recalling an image, running an existing presentation, etc. The menu 302 also provides a library of common shapes and a palette of colors.

Figure 6:
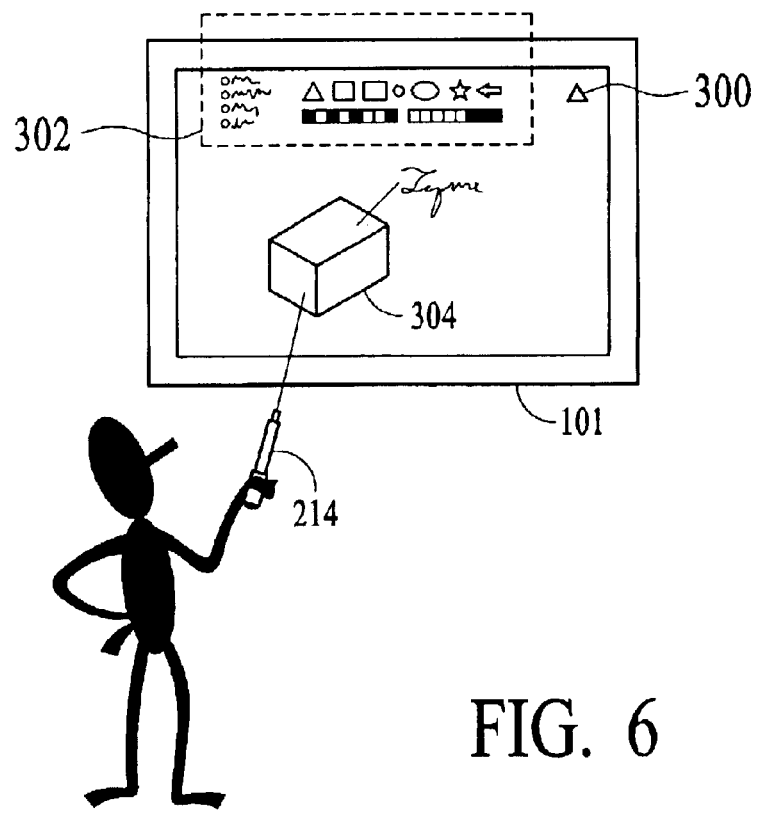
FIG. 6 is a diagram showing an operator using the menu to apply color to a freehand drawing of the cube in accordance with the present invention.

FIG. 6 is a diagram showing an operator using the menu to apply color to a freehand drawing of the cube in accordance with the present invention. Via the menu 302, the IDC device can assist in creating and modifying drawings. For example, an operator can call up a circle, or other shape. The operator can produced shaped outlines and coloration, as other than mechanical aids such as straightedges that can be provided.

The operator can use the menu 302, for example, to color a drawing 304. The laser pointer 214 is turned on and aimed at a desired shape or color on the menu 302. Then, while the laser pointer 214 remains on, its beam is moved to a point on the whiteboard 101 where the color or shape is desired. Then, the laser pointer 214 is turned off. Finally, the menu 302 may be hidden again using the icon 300 in the upper right corner of the whiteboard 101.

According to the system and method disclosed herein, a system and method in accordance with the present invention provides numerous benefits. It provides a useful, novel, and non-trivial solution to the problem of presenting, capturing, and modifying images on a whiteboard in a conference room, classroom, or office environment. In addition to the ability to display presentations prepared in advance and the ability to record drawings produced during the course of a meeting, the system responds to other types of information. Such information can include gestures or menu selections made by a person. Such information can be used to modify the current drawing or text, save the current contents of the whiteboard, recall a previous image.

Although the present invention has been described in accordance with the embodiments shown, one of ordinary skill in the art will readily recognize that there could be variations to the embodiments and those variations would be within the spirit and scope of the present invention. Although the present invention disclosed herein is described in the context of white boards, the present invention also applies to any apparatus, structure, or surface that can be used for presentations, and will still remain within the spirit and scope of the present invention. Accordingly, many modifications may be made by one of ordinary skill in the art without departing from the spirit and scope of the appended claims.

What is claimed is:

1. An image capture and display (ICD) device comprising:
    a projector adapted to display at least one first image onto a surface;
    a camera adapted to capture at least one second image from the surface, wherein the at least one second image comprises the at least one first image and markings made directly on the surface; and
    interface and control electronics coupled to the projector and to the camera, wherein the interface electronics are adapted to provide the projector with the at least one first image and adapted to process the at least one second image from the camera.

2. The ICD device of claim 1 wherein the interface and control electronics is controlled by a computer system.

3. The ICD device of claim 1 wherein the interface and control electronics comprises a processor.

4. The ICD device of claim 1 wherein the interface and control electronics can modify the at least one first image.

5. The ICD device of claim 1 wherein an input device can be utilized with the ICD device to provide markings on the surface.

6. The ICD device of claim 5 wherein the input device comprises a laser pointer.

7. The ICD device of claim 5 wherein the input device comprises one of a keyboard, mouse, touch screen, pad, and stylus device.

8. The ICD device of claim 5 wherein the input device provides a modification to an image on the surface.

9. The ICD device of claim 1 wherein the camera comprises a digital camera.

10. The ICD device of claim 1 wherein the camera comprises a CCD camera.

11. The ICD device of claim 1 wherein a dual-optic system is provided wherein a first optical path is provided for images that are projected by the projector and a second optical path is provided for images that are captured by the camera.

12. The ICD device of claim 1 which further comprises a memory coupled to the interface electronics upon which image data can be stored and from which presentations may be retrieved.

13. The ICD device of claim 1 further including a computer system coupled to the ICD device.

14. The ICD device of claim 1 wherein at least one image originates from data stored on the computer system.

15. A method for capturing and displaying images on a presentation board, the method comprising:
    (a) displaying at least one first image onto a surface of the presentation board utilizing a projector;
    (b) capturing the at least one second image from the surface utilizing a camera, wherein the at least one second image comprises the at least one first image and markings made directly on the surface;
    (c) providing the at least one first image on the surface utilizing the interface and control electronics, the interface and control electronics being coupled to the camera and the projector; and
    (d) processing the at least one second image by the interface and control electronics.

16. The method of claim 15 wherein the at least one image can be modified by utilizing the interface and control electronics.

17. The method of claim 15 wherein the processing step of (d) further comprises the step of (d2) automatically initiating software that takes into account projected messages when comparing viewed images, looking for a change.

18. The method of claim 15 further comprising the step of (e) determining a registration of displayed pixels and viewed pixels.

19. The method of claim 15 further comprising the step of (d) mapping between projected pixels and viewed pixels.

20. The method of claim 15 further comprising the step of (e) compensating for surface and lighting defects.

21. The method of claim 15 wherein the interface and control electronics is controlled by a computer system.

22. The method of claim 15 wherein the interface and control electronics comprises a processor.

23. The method of claim 15 wherein the interface and control electronics can modify the at least one first image.

24. The method of claim 15 wherein an input device can be utilized with the ICD device to provide markings on the surface.

25. The method of claim 24 wherein the input device comprises a laser pointer.

26. The method of claim 24 wherein the input device comprises one of a keyboard, mouse, touch screen, pad, and stylus device.

27. The method of claim 24 wherein the input device provides a modification to an image on the surface.

28. An image capture and display (ICD) system comprising:
- a surface;
- an ICD device comprising:
  - a projector adapted to display at least one first image onto a surface;
  - a camera adapted to capture the at least one second image from the surface, wherein the at least one second image comprises the at least one first image and markings made directly on the surface; and
  - interface and control electronics coupled to the projector and to the camera, wherein the interface and control electronics are adapted to provide the projector with the at least one first image and adapted to process the at least one second image from the camera, wherein the at least one image from the camera comprises markings made directly on the surface; and
- a computer system for communicating with the ICD device to provide the at least one first image on the surface.

29. The ICD system of claim 28 wherein the interface and control electronics comprises a processor.

30. The ICD system of claim 28 wherein the interface and control electronics can modify the at least one first image.

31. The ICD system of claim 28 wherein an input device can be utilized with the ICD device to provide markings on the surface.

32. The ICD system of claim 31 wherein the input device comprises a laser pointer.

33. The ICD system of claim 31 wherein the input device comprises one of a keyboard, mouse, touch screen, pad, and stylus device.

34. The ICD system of claim 31 wherein the input device provides a modification to an image on the surface.

35. The ICD system of claim 28 wherein the camera comprises a digital camera.

36. The ICD system of claim 28 wherein the camera comprises a CCD camera.

37. The ICD system of claim 28 wherein a dual-optic system is provided wherein a first optical path is provided for images that are projected by the projector and a second optical path is provided for images that are captured by the camera.

38. The ICD system of claim 28 which further comprises a memory coupled to the interface electronics upon which image data can be stored and from which presentations may be retrieved.

39. An image capture and display (ICD) device comprising:
- a projector adapted to display at least one first image onto a whiteboard;
- a camera adapted to capture at least one second image from the whiteboard, wherein the at least one second image comprises the at least one first image and markings made by a marker on the whiteboard; and
- interface and control electronics coupled to the projector and to the camera, wherein the interface electronics are adapted to provide the projector with the at least one first image and adapted to process the at least one second image from the camera.

* * * * *